(12) United States Patent
Tan

(10) Patent No.: US 10,586,108 B2
(45) Date of Patent: Mar. 10, 2020

(54) PHOTO PROCESSING METHOD AND APPARATUS

(71) Applicant: Tencent Technology (Shenzhen) Company Limited, Shenzhen (CN)

(72) Inventor: Guofu Tan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/386,152

(22) Filed: Apr. 16, 2019

(65) Prior Publication Data

US 2019/0244027 A1    Aug. 8, 2019

Related U.S. Application Data

(63) Continuation of application No. 15/694,162, filed on Sep. 1, 2017, now Pat. No. 10,303,948, which is a
(Continued)

(30) Foreign Application Priority Data

Nov. 25, 2015    (CN) .......................... 2015 1 0833467

(51) Int. Cl.
*G06K 9/00*    (2006.01)
*G06K 9/62*    (2006.01)
(Continued)

(52) U.S. Cl.
CPC .......... *G06K 9/00684* (2013.01); *G06F 3/14* (2013.01); *G06F 16/51* (2019.01); *G06F 16/58* (2019.01);
(Continued)

(58) Field of Classification Search
CPC .......... G06K 9/00684; G06K 9/00241; G06K 9/00268; G06K 9/6215; G06K 9/00228;
(Continued)

(56) References Cited

U.S. PATENT DOCUMENTS 8,150,217 B2 *    4/2012    Nakamura ........... H04N 5/2258
                                                 382/309
8,990,672 B1 *    3/2015    Grosz ................... G06F 17/212
                                                 715/202
(Continued)

FOREIGN PATENT DOCUMENTS

CN    102033958 A    4/2011
CN    103034714 A    4/2013
(Continued)

OTHER PUBLICATIONS

Tencent Technology, ISRWO, PCT/CN2016/083417, dated Aug. 16, 2016, 5 pgs.
(Continued)

*Primary Examiner* — Yon J Couso
(74) *Attorney, Agent, or Firm* — Morgan, Lewis & Bockius LLP

(57) ABSTRACT

The present disclosure discloses a photo processing method and an apparatus for grouping photos into photo albums based on facial recognition results. The method includes: performing face detection on multiple photos, to obtain a face image feature set, each face image feature in the face image feature set corresponding to one of the multiple photos; determining a face-level similarity for each pair of face image features in the face image feature set; determining a photo-level similarity between each pair of photos in the multiple photos in accordance with their associated face-level similarities; generating a photo set for each target photo in the multiple photos, wherein any photo-level similarity between the target photo and another photo in the
(Continued)

photo set exceeds a predefined photo-level threshold; and generating a label for each photo set using photographing location and photographing time information associated with the photos in the photo set.

17 Claims, 3 Drawing Sheets

Related U.S. Application Data continuation-in-part of application No. PCT/CN2016/083417, filed on May 26, 2016.

(51) Int. Cl.
*G06F 16/51* (2019.01)
*G06F 16/58* (2019.01)
*G06F 3/14* (2006.01)
*H04N 1/00* (2006.01)

(52) U.S. Cl.
CPC ..... *G06K 9/00228* (2013.01); *G06K 9/00241* (2013.01); *G06K 9/00268* (2013.01); *G06K 9/00295* (2013.01); *G06K 9/6215* (2013.01); *G06K 9/6222* (2013.01); *H04N 1/00196* (2013.01)

(58) Field of Classification Search
CPC .... G06K 9/00295; G06K 9/6222; G06F 3/14; G06F 16/51; G06F 16/58; H04N 1/00196
See application file for complete search history.

(56) References Cited

U.S. PATENT DOCUMENTS

| | | | |
|---|---|---|---|
| 2006/0078201 | A1 | 4/2006 | Kim et al. |
| 2006/0251338 | A1 | 11/2006 | Gokturk et al. |
| 2010/0156834 | A1 | 6/2010 | Sangster |
| 2010/0226584 | A1 | 9/2010 | Weng et al. |
| 2015/0143236 | A1* | 5/2015 | Tena Rodriguez ... G06F 17/212 715/273 |
| 2016/0034559 | A1 | 2/2016 | Feyereisl et al. |
| 2018/0107660 | A1 | 4/2018 | Wang et al. |

FOREIGN PATENT DOCUMENTS

| | | |
|---|---|---|
| CN | 103064864 A | 4/2013 |
| CN | 103139386 A | 6/2013 |
| CN | 104166694 A | 11/2014 |
| CN | 104168378 A | 11/2014 |
| CN | 104820675 A | 8/2015 |
| CN | 105451846 A | 3/2016 |

OTHER PUBLICATIONS

Tencent Technology, IPRP, PCT/CN2016/083417, dated May 29, 2018, 4 pgs.

* cited by examiner

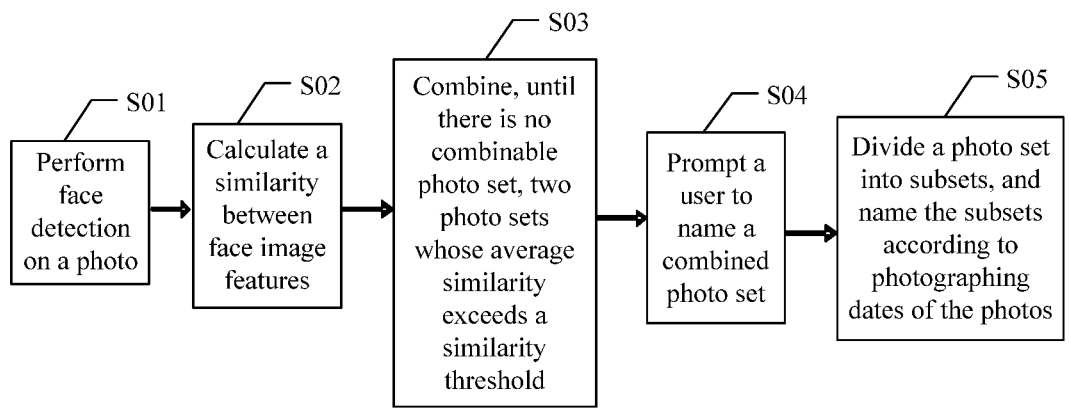
FIG. 3
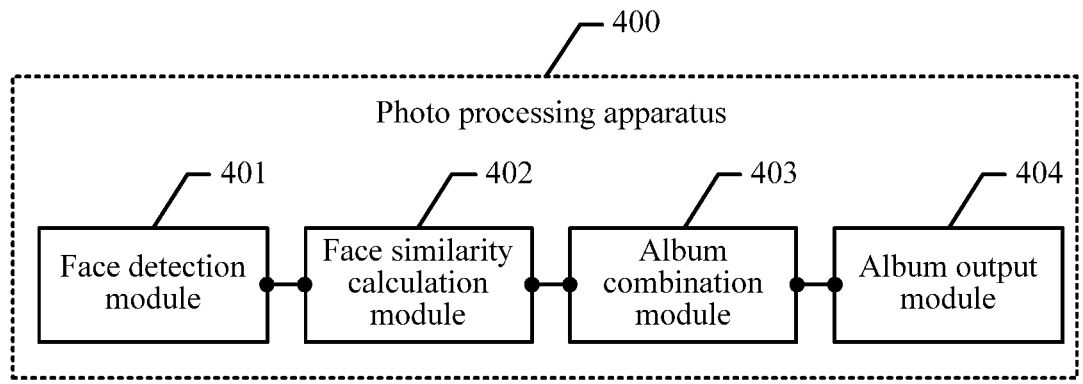
FIG. 4-a
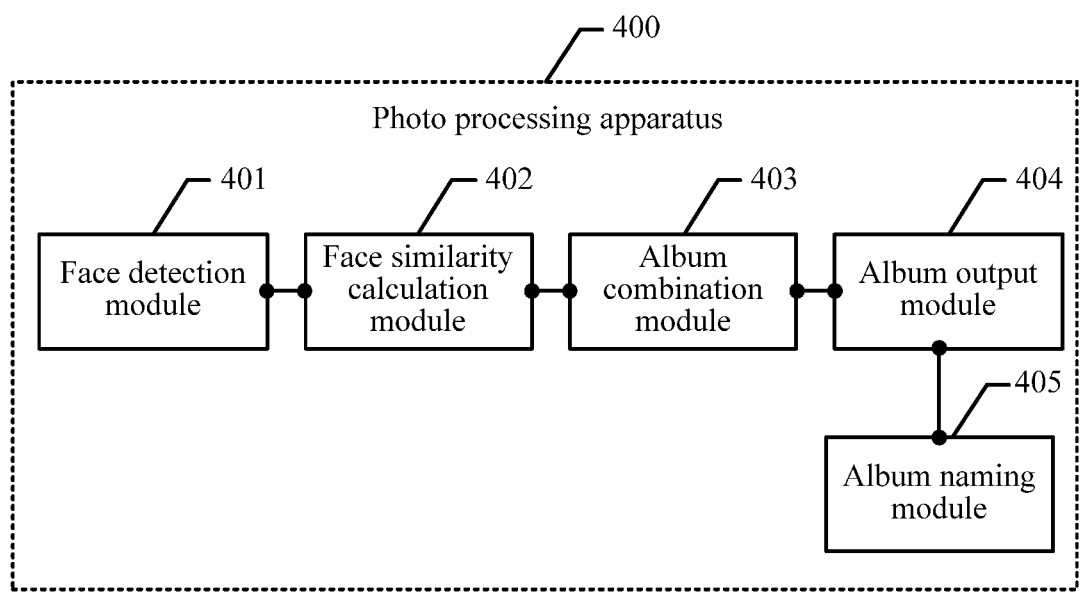
FIG. 4-b

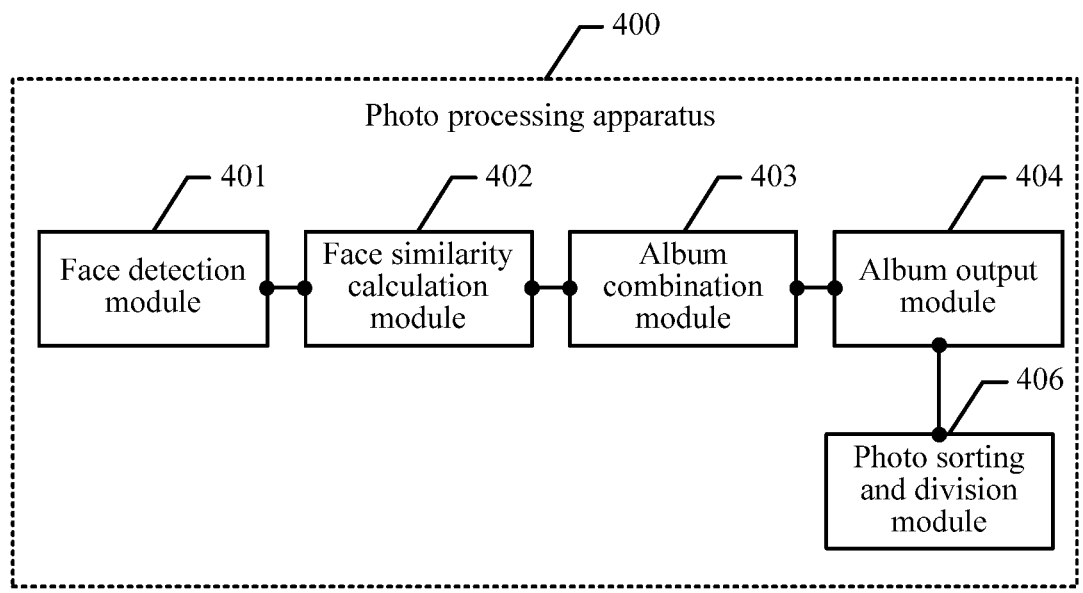
FIG. 4-c
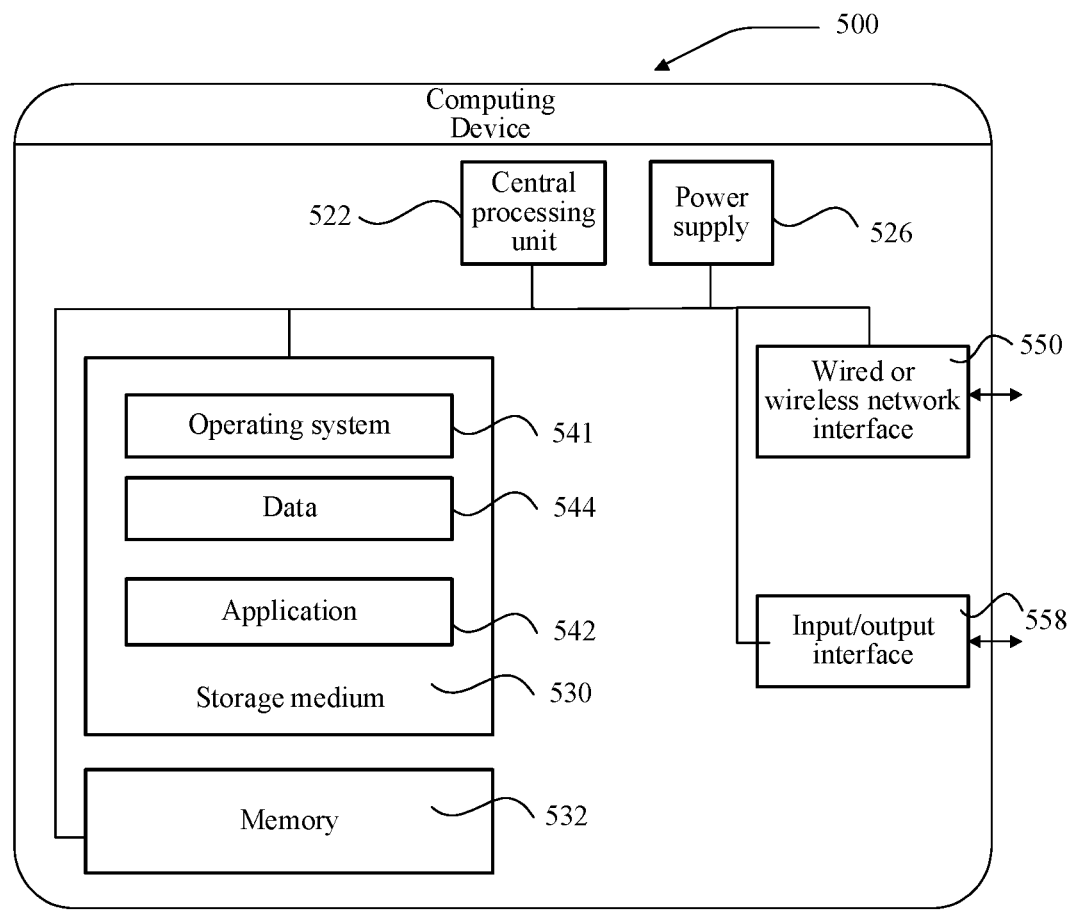
FIG. 5

PHOTO PROCESSING METHOD AND APPARATUS

CROSS-REFERENCE TO RELATED APPLICATIONS

This application is a continuation of U.S. application Ser. No. 15/694,162, entitled "PHOTO PROCESSING METHOD AND APPARATUS" filed on Sep. 1, 2017, which is a continuation-in-part application of PCT/CN2016/083417, entitled "PICTURE PROCESSING METHOD AND APPARATUS" filed on May 26, 2016, which claims priority to Chinese Patent Application No. 201510833467.9, filed with the State Intellectual Property Office of the People's Republic of China on Nov. 25, 2015, and entitled "PHOTO PROCESSING METHOD AND APPARATUS", all of which are incorporated herein by reference in their entirety.

FIELD OF THE TECHNOLOGY

The present disclosure relates to the field of computer technologies, and in particular, to a photo processing method and apparatus.

BACKGROUND OF THE DISCLOSURE

Currently, with the popularity of digital cameras, mobile phones, cameras, and the like, a quantity of images that are generated is increasing. In particular, many photos may be photographed by a user during a tour. For example, a traveler in a package tour visits a lot of scenery spots every day. A lot of photos are stored in a camera, a mobile phone, or another photographing device at the end of the day. How to collate these photos is a problem. Because there is a large quantity of photos, to classify the photos manually is time-consuming and labor-intensive. In addition, photos of a same type are generated in different devices that have been used by a same user, and a large quantity of photos are generated in a same device that have been used by different users, leading to omissions during manual collation.

In addition, people like to photograph self-portraits when being alone, and like to photograph group photos when being in a tour together. When friends or family members usually share one camera during a tour, or when photos in multiple photographing devices are uploaded to a same album, the album includes photos of multiple users. When browsing the album, people can only search for the large quantity of photos for photos that they want. In a conventional album collation method, albums are usually separately generated according to photographing time and places of photos by using photographing time information and place information. However, by means of an existing album collation method, only a requirement of a user to classify photos according to time and places is met, and a requirement that a user browses multiple albums according to portrait classification cannot be met.

SUMMARY

Embodiments of the present disclosure provide a photo processing method and apparatus, so that photos may be automatically grouped based on facial recognition results, and a requirement that a user browses multiple albums according to portrait classification is met.

To resolve the foregoing technical problem, embodiments of the present disclosure provide the following technical solutions:

According to one aspect, an embodiment of the present disclosure provides a photo processing method, including:

performing face detection on multiple photos, to obtain a face image feature set, each face image feature in the face image feature set corresponding to one of the multiple photos;

determining a face-level similarity for each pair of face image features in the face image feature set;

generating a photo set for a photo that corresponds to each face image feature in the face image feature set;

combining two photo sets in which photos that correspond to a pair of face image features whose face-level similarity is greater than a preset face-level similarity threshold are located;

determining, according to the face-level similarity that corresponds to each pair of face image features, a photo set-level similarity between the combined photo set and another photo set; and when the photo set-level similarity between the combined photo set and the another photo set exceeds the predefined photo set-level similarity threshold, combining them into the photo album.

According to another aspect, an embodiment of the present disclosure further provides a photo processing apparatus, including:

at least one processor; and a memory, the memory storing a program instruction, and the apparatus is configured to perform the following operations when the instruction is executed by the processor:

performing face detection on multiple photos, to obtain a face image feature set, each face image feature in the face image feature set corresponding to one of the multiple photos;

determining a face-level similarity for each pair of face image features in the face image feature set;

generating a photo set for a photo that corresponds to each face image feature in the face image feature set;

combining two photo sets in which photos that correspond to a pair of face image features whose face-level similarity is greater than a preset face-level similarity threshold are located;

determining, according to the face-level similarity that corresponds to each pair of face image features, a photo set-level similarity between the combined photo set and another photo set; and when the photo set-level similarity between the combined photo set and the another photo set exceeds the predefined photo set-level similarity threshold, combining them into the photo album.

In the embodiments of the present disclosure, first, face detection is separately performed on all photos that need to be classified, to obtain a face image feature set. Then, a similarity that corresponds to each pair of face image features is calculated. Next, a photo corresponding to each face image feature in the face image feature set is used as an initial photo set, and the initial photo set is used as an initial condition. Whether a photo set-level similarity between two photo sets exceeds a preset similarity threshold is determined through calculation in a cyclic manner for multiple times according to the face-level similarity that corresponds to the pair of face image features. Two photo sets whose photo set-level similarity exceeds the photo set-level similarity threshold are combined into one photo set until there is no combinable photo set. Finally, at least one photo set obtained after the circulation ends is output. Each photo set that is obtained after the circulation ends includes at least one photo that corresponds to a same person. In the embodiments of the present disclosure, because the photo sets are combined by using a similarity between the face image features, all of the combined photo sets include photos that correspond to a same person. Therefore, in this embodiment of the present disclosure, all photos that need to be classified can be divided into different photo sets according to face image features, so that all photos that are included in a same photo set that is finally output correspond to a same person. Therefore, photos may be automatically grouped based on facial recognition results, and a requirement that a user browses multiple albums according to portrait classification is met.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons skilled in the art may still derive other drawings from these accompanying drawings.

FIG. 3 is a schematic diagram of an application scenario of a photo processing method according to an embodiment of the present disclosure;

FIG. 4-a is a schematic structural diagram of a photo processing apparatus according to an embodiment of the present disclosure;

FIG. 4-b is a schematic structural diagram of another photo processing apparatus according to an embodiment of the present disclosure;

FIG. 4-c is a schematic structural diagram of another photo processing apparatus according to an embodiment of the present disclosure; and FIG. 5 is a schematic structural diagram of a computing device to which a photo processing method according to an embodiment of the present disclosure is applied.

DESCRIPTION OF EMBODIMENTS

Embodiments of the present disclosure provide a photo processing method and apparatus, so that photos may be automatically grouped based on facial recognition results, and a requirement that a user browses multiple albums according to portrait classification is met.

To make the objectives, features, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons skilled in the art based on the embodiments of the present disclosure shall fall within the protection scope of the present disclosure.

The terms "include", "contain" and any other variants in the specification, claims, and the foregoing accompanying drawings in the present disclosure mean to cover the non-exclusive inclusion, so that a process, method, system, product, or device that includes a series of units is not necessarily limited to those units, but may include other units not expressly listed or inherent to such a process, method, product, or device.

The following separately gives detailed descriptions.

Figure 1:
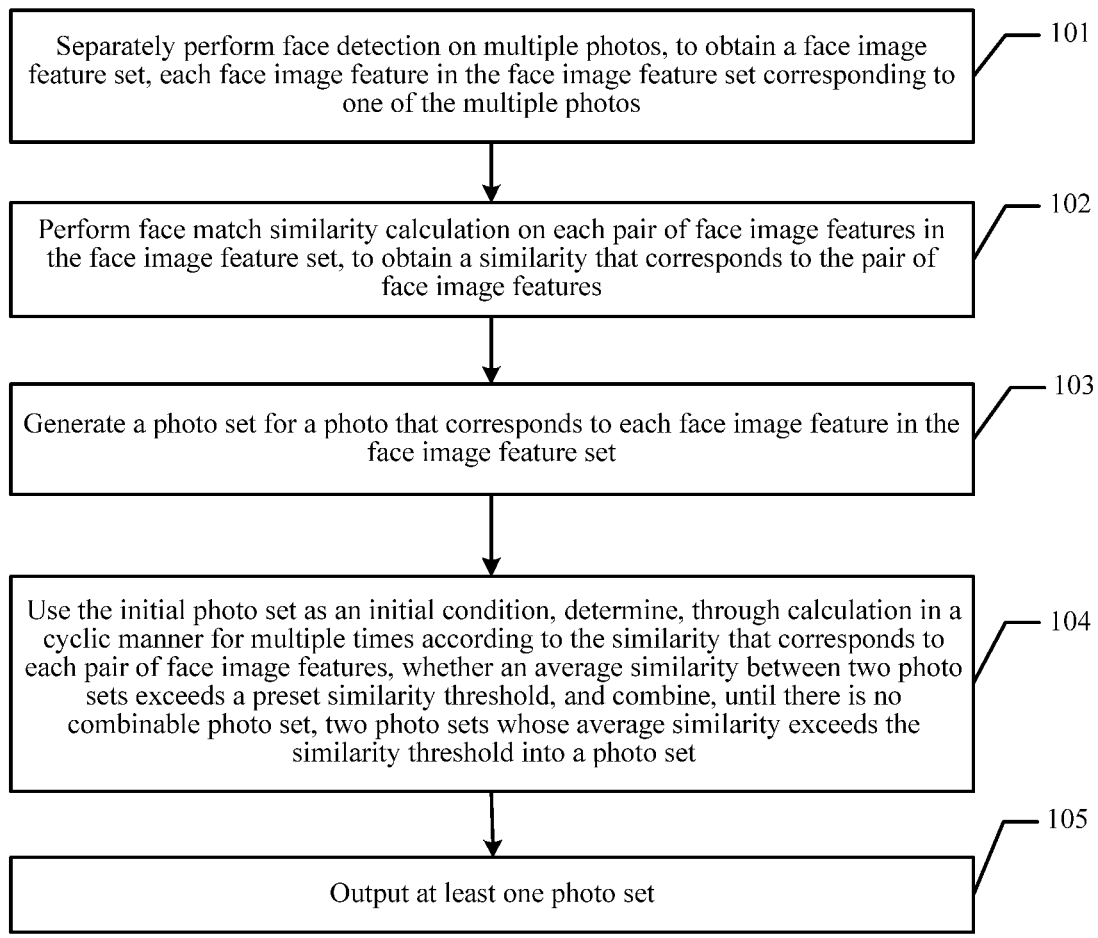
FIG. 1 is a flowchart of a photo processing method according to an embodiment of the present disclosure.

An embodiment of a photo processing method of the present disclosure and may specifically be applied to systematically classification of multiple photos. Referring to FIG. 1, the photo processing method provided in this embodiment of the present disclosure may include the following steps.

101: Perform face detection on multiple photos, to obtain a face image feature set, each face image feature in the face image feature set corresponding to one of the multiple photos.

In this embodiment of the present disclosure, face detection is separately performed on multiple photos that need to be classified, to obtain a face image feature set. The face image feature set includes face image features that are detected on each photo. Each face image feature in the face image feature set corresponds to a photo.

In this embodiment of the present disclosure, when photos that are from one device or multiple devices need to be grouped by means of classification, first, all photos that need to be classified are obtained, and then face detection are performed on all of the photos one by one that need to be classified, or face detection may be performed simultaneously on all of the photos that need to be classified. In this embodiment of the present disclosure, the face detection may be performed on a photo by using multiple types of feature extraction methods. The feature extraction methods are, for example, a local binary pattern (English full name: Local Binary Patterns, English abbreviation: LBP), a histogram of oriented gradient (English full name: Histogram of Oriented Gradient, English abbreviation: HOG), or a deep-learning-based GABOR method. A specific facial recognition method is not limited in this embodiment of the present disclosure.

In this embodiment of the present disclosure, after the face detection is separately performed on all of the photos that need to be classified, all face image features that are extracted can be combined into a face image feature set. In some embodiments of the present disclosure, the photo processing method may further include the following steps:

After face detection is separately performed on all of the photos that need to be classified in step 101, step A1 is performed:

Input a photo, that is in all of the photos that need to be classified, on which no face image feature is detected to a non-portrait album.

In this embodiment of the present disclosure, after the face detection is performed on the photos in step 101, the photos that include the face image features may be preserved for subsequent processing. For photos on which no face image feature is detected, the photos do not belong to the portrait photos. For example, the photos may be photographed scenic photos. The photos that do not include face image features may be input to a non-portrait album, and the photos that include the face image features are preserved in a portrait album. In a subsequent embodiment, all of the portrait photos in the portrait album may further be classified according to portraits.

It should be noted that in this embodiment of the present disclosure, for each photo that needs to be classified, a face image feature may be detected, or no face image feature may be detected. In addition, one face image feature may be detected on a photo, or multiple face image features may be detected on a portrait group photo. This is specifically determined by content that is actually included in a photo that is provided by a user for classification. When only one face image feature is detected on a photo, the detected face image feature is put into a face image feature set. When at least two face image features are detected on a group photo, all detected face image features are put into the face image feature set. In addition, in this embodiment of the present disclosure, each face image feature in the face image feature set corresponds to a photo, that is, when N face image features are detected on a photo, the photo needs to be copied for (N−1) times. There are N same photos in total, including the original photo, that are in a one-to-one correspondence with the N face image features. An example is given as follows for description. There are three photos in total that need to be classified, which are respectively photos P1, P2, and P3. If a face image feature f1 is detected on the photo P1, two face image features f2 and f3 are detected on the photo P2, and three face image features f4, f5, and f6 are detected on the photo P3, all of the face image features f1, f2, f3, f4, f5, and f6 that are detected on the three photos need to be put into a face image feature set. The face image feature set includes six face image features in total, and each face image feature corresponds to a photo. Therefore, the photo P2 needs to be copied once, and the photo P3 needs to be copied twice, to ensure that each face image feature in the face image feature set corresponds to a photo.

102: Perform face match similarity calculation on each pair of face image features in the face image feature set, to obtain a face-level similarity that corresponds to the pair of face image features.

Each pair of face image features are obtained by combining any two face image features in the face image feature set.

In this embodiment of the present disclosure, after the face image feature set is obtained in step 101, each pair of face image features may be obtained by combining any two face image features in the face image feature set. A pair of face image features refers to a feature pair formed by two face image features in the face image feature set. Each pair of face image features in the face image feature set may be obtained by performing mutual combination on each face image feature in the face image feature set. An example is given as follows for description. A face image feature set includes six face image features in total. All of the face image features are: f1, f2, f3, f4, f5, and f6. A pair of face image features in the face image feature set may be (f1, f2), or (f1, f3), or (f1, f4), or (f1, f5), or (f1, f6), or (f2, f3), or (f2, f4), or (f2, f5), or (f2, f6), or (f3, f4), or (f3, f5), or (f3, f6), or (f4, f5), or (f4, f6), or (f5, f6). It may be understood that in this embodiment of the present disclosure, (f2, f1) and (f1, f2) refer to a same pair of face image features.

After a pair of face image features is formed by selecting any two face image features in the face image feature set, face match similarity calculation is performed on the pair of face image features, to obtain a face-level similarity that corresponds to the pair of face image features. A similarity between two face image features in a pair of face image features is defined as a face-level similarity that corresponds to the pair of face image features. A similarity between two face image features may be measured by calculating a distance between the two face image features. For example, a cos distance or a Euclidean distance between the two face image features may be calculated to measure the face-level similarity that corresponds to the pair of face image features.

103: Generate a photo set for a photo that corresponds to each face image feature in the face image feature set. That is, the photo that corresponds to each face image feature in the face image feature set is used as an initial photo set. Each photo set corresponds to an album.

In some embodiments, before generating the photo set, a photo-level similarity between each pair of photos in the multiple photos is determined in accordance with their associated face-level similarities. The photo-level similarity between a pair of photos is a summation of the face-level similarities between the face image features in the two photos. This photo-level similarity may be further normalized by a factor (e.g., the number of face image features found in the two photos). Next, a label is generated for each photo set using photographing location and photographing time information associated with the photos in the photo set. For example, a smartphone or a tablet computer is often equipped with geographical locating capabilities (e.g., using a built-in GPS chip). When a user uses the smartphone or tablet computer to take a photo, the photo is associated with meta data including the current location where the photo is taken and the current timestamp provided by the smartphone or tablet. Such information can be used for generating a label for the photo set.

104: Use the initial photo set as an initial condition, determine, through calculation in a cyclic manner for multiple times according to the similarity that corresponds to each pair of face image features, whether a photo set-level similarity between two photo sets exceeds a preset similarity threshold, and combine, until there is no combinable photo set, two photo sets whose photo set-level similarity exceeds the photo set-level similarity threshold into a photo set.

That is, in this step, first, photo sets in which photos that correspond to a pair of face image features whose face-level similarity is greater than a preset face-level similarity threshold are combined. Then, a photo set-level similarity between the combined photo set and another photo set is calculated according to the similarity that corresponds to each pair of face image features. If the photo set-level similarity between the combined photo set and the another photo set exceeds the photo set-level similarity threshold, the two photo sets are combined into one photo album. In some embodiments, the labels of the two or more photo sets are also combined into one label for the photo album.

In this embodiment of the present disclosure, after the similarity of each pair of face image features in the face image feature set is calculated, photos whose portrait photos are particularly similar are combined into a photo set according to a similarity between face image features. In step 103, a photo that corresponds to each face image feature in the face image feature set is used as an initial photo set. There is a same quantity of initial photo sets as that of the face image features in the face image feature set. In step 104, the initial photo set is used as an initial condition, for all photo sets, whether two photo sets need to be combined into a same photo set is determined by calculating whether a photo set-level similarity between the two photo sets exceeds a preset similarity threshold. If the photo set-level similarity between the two photo sets exceeds the photo set-level similarity threshold, it indicates that photos in the two photo sets correspond to a same person, and therefore the two photo sets can be combined. If the photo set-level similarity between the two photo sets does not exceed the photo set-level similarity threshold, it indicates that the photos in the two photo sets do not correspond to a same person, and therefore the two photo sets cannot be combined. After a turn of photo set combination is completed, whether the photo sets can be combined, until there is no combinable photo set, is determined by continually using a relationship between the photo set-level similarity and the photo set-level similarity threshold between the photo sets. An photo set-level similarity between two photo sets refers to a photo set-level similarity between face image features that correspond to photos included in the two photo sets.

It should be noted that each photo set includes only one photo when being in an initial state, and therefore a photo set-level similarity between two initial photo sets is equal to a similarity between face image features that correspond to photos in the initial two photo sets. As the photos included in photo sets continually increase, whether the photos in the two photo sets correspond to a same person may be determined by using a relationship between the photo set-level similarity and a similarity threshold.

In this embodiment of the present disclosure, a photo set-level similarity between two photo sets is related to face image features that correspond to photos included in the two photo sets, and is related to a quantity of the photos included in the photo sets. In a specific implementation scenario, the photo set-level similarity between the two photo sets may be calculated in multiple manners. Any photo set-level similarity that is measured by using a similarity between two face image features and a quantity of photos may be used as an implementation of calculating the photo set-level similarity between the two photo sets. For example, in some embodiments of the present disclosure, step 104 may specifically include the following steps:

B1: Calculate a photo set-level similarity between two photo sets in the following manner:

$$\bar{s} = \left\{ \frac{1}{n_i n_j} \sum s_{ij} (f_i \in A_i, f_j \in A_j) \right\},$$

where $\bar{s}$ represents the photo set-level similarity, $A_i$ represents one of the two photo sets, $A_j$ represents the other of the two photo sets, $f_i$ represents a face image feature that corresponds to a photo in the photo set $A_i$, $f_j$ represents a face image feature that corresponds to a photo in the photo set $A_j$, $s_{ij}$ represents a similarity that corresponds to a pair of face image features formed by the face image feature $f_i$ and the face image feature $f_j$, $n_i$ represents a quantity of photos in the photo set $A_i$, and $n_j$ represents a quantity of photos in the photo set $A_j$, i and j being two unequal natural numbers.

B2: Determine whether the photo set-level similarity $\bar{s}$ exceeds a preset similarity threshold.

In step B1 and step B2, whether the two photo sets $A_i$ and $A_j$ can be combined is used as an example, i and j being two unequal natural numbers. By using value variations of i and j, whether all photo sets can be combined can be determined through calculation. It should be noted that, in step B1 and step B2, a process of determining whether two photo sets can be combined is described. In this embodiment of the present disclosure, step B1 and step B2 need to be performed in a cyclic manner for multiple times, to complete combination of any two photo sets that meet the photo set-level similarity threshold. The circulation calculation does not end until there is no combinable photo set, and step 105 is performed after the circulation calculation ends.

It should be noted that in this embodiment of the present disclosure, the calculation manner in step B1 for calculating the photo set-level similarity between the two photo sets is only an exemplary manner that can be implemented for description. In different application scenarios of the present disclosure, the photo set-level similarity may further be determined in another calculation manner. An example is given as follows for description. Different weights may be allocated in consideration of face image features that correspond to different photos. In the different photos, a large weight is allocated to photos whose quantity of face image features is small, and a small weight is allocated to photos whose quantity of face image features is large, so that a final result of the photo set-level similarity may be regulated. For another example, the calculation expression in step B1 may be further modified. For example, a proportional control factor may be multiplied with to change the calculation manner of the photo set-level similarity. This manner is also a photo set-level similarity calculation manner that can be implemented. In addition, the photo set-level similarity threshold in this embodiment of the present disclosure may be flexibly set according to a specific application scenario. For example, analog simulation may be performed by using face image features that correspond to multiple photos. Finally, a threshold is determined as the photo set-level similarity threshold. A frequently used similarity threshold may be a percentile that is equal to or greater than 90%, for example, 90% or 92%.

105: Output at least one photo set.

The at least one photo set that is obtained after the circulation ends is output in step 105. At least one photo that corresponds to a same person is included in each photo set that is obtained after the circulation ends.

In this embodiment of the present disclosure, combination calculation is performed on the photo sets in a cyclic manner for multiple times in step 104, and the circulation calculation does not end until there is no combinable photo set. In addition, at least one photo set that is finally obtained is output after the circulation calculation ends. Because a combinable photo set includes photos of a same person, and a photo set that can no longer be combined includes photos of different persons, in the at least one photo set obtained after the circulation ends in step 105, photos in each photo set correspond to a same person. Therefore, when a user opens a photo set that is obtained after the circulation ends, the user may see that all photos in a photo set correspond to a same person, so that it is convenient for the user to browse all photos that correspond to only one person, and a photo browsing requirement that the user uses a portrait as a target is met.

In some embodiments of the present disclosure, after the at least one photo set that is obtained after the circulation ends is output in step 105, the photo processing method provided in this embodiment of the present disclosure may further include the following step:

C1. Prompt a user to perform album naming, on each photo set that is obtained after the circulation ends, according to a same person that corresponds to all photos in the photo set, and change a name of each photo set obtained after the circulation ends into a naming result that is entered by the user.

In this embodiment of the present disclosure, in step 105, the at least one photo set that is obtained after the circulation ends may be output to the outside by using a user interface. The user may browse these output photo sets. In addition, in this embodiment of the present disclosure, the user may be prompted to name each photo set (or, an album) or update the label for the photo set based on the photographing location and photographing time information associated with the photos in the photo set. After the user enters a naming result, the name of the photo set may be changed according to the naming result entered by the user, to facilitate browsing the photo set by the user subsequently.

In some embodiments of the present disclosure, after the at least one photo set that is obtained after the circulation ends is output in step 105, the photo processing method provided in this embodiment of the present disclosure may further include the following step:

D1: Sort, according to an order of photographing time of the photos, all of the photos in each photo set that is output after the circulation ends, or divide, according to the order of photographing time of the photos, all of the photos in each photo set that is output after the circulation ends into different photo subsets, and name each photo subset (that is, a sub-album) according to the photographing time.

The photo sets that are output in step 105 after the circulation ends are all albums that are classified according to persons in the photos. Because after being generated by a photographing device, a photo may usually carry photographing time information, in this embodiment of the present disclosure, to facilitate browsing by a user, photos may be sorted according to photographing time of photos in a same photo set, or the photos in the same photo set may be divided into different photo subsets according to the photographing time, and the photo subsets may further be named according to the photographing time, to further facilitate browsing and searching by the user.

It may be learned by using the foregoing descriptions that is in this embodiment and that is of the embodiment of the present disclosure, first, face detection is separately performed on all photos that need to be classified, to obtain a face image feature set. Then, a similarity that corresponds to each pair of face image features is calculated. Next, a photo corresponding to each face image feature in the face image feature set is used as an initial photo set, and the initial photo set is used as an initial condition. Whether a photo set-level similarity between two photo sets exceeds a preset similarity threshold is determined through calculation in a cyclic manner for multiple times according to the face-level similarity that corresponds to the pair of face image features. Two photo sets whose photo set-level similarity exceeds the photo set-level similarity threshold are combined into one photo set until there is no combinable photo set. Finally, at least one photo set obtained after the circulation ends is output. Each photo set that is obtained after the circulation ends includes at least one photo that corresponds to a same person. In this embodiment of the present disclosure, because the photo sets are combined by using a similarity between the face image features, all of the combined photo sets include photos that correspond to a same person. Therefore, in this embodiment of the present disclosure, all photos that need to be classified can be divided into different photo sets according to face image features, so that all photos that are included in a same photo set that is finally output correspond to a same person. Therefore, photos may be automatically grouped based on facial recognition results, and a requirement that a user browses multiple albums according to portrait classification is met.

Figure 2:
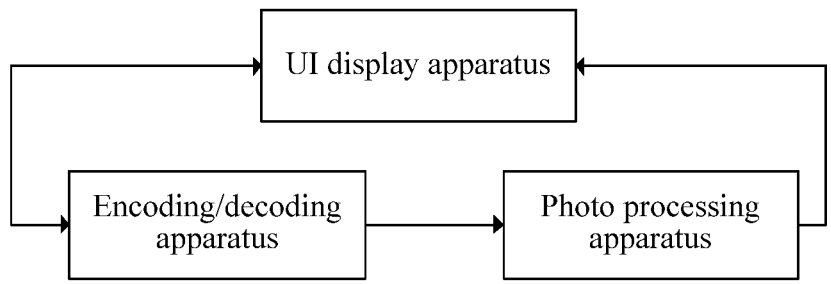
FIG. 2 is a schematic structural diagram of a photo display system according to an embodiment of the present disclosure.

For better understanding and implementation of the foregoing solution of the embodiment of the present disclosure, the following makes specific descriptions by using corresponding application scenarios as examples. As shown in FIG. 2, FIG. 2 is a schematic structural diagram of composition of a photo display system according to an embodiment of the present disclosure. The photo display system includes three parts: a user interface (English full name: User Interface, English abbreviation: UI) display apparatus, an image encoding/decoding apparatus, and a photo processing apparatus.

The UI display apparatus is responsible for displaying an image and an operating interface, the image encoding/decoding apparatus is responsible for performing an encoding/decoding operation on the image, and the photo processing apparatus is responsible for collating photos and automatically generating an album.

Specifically, the UI display apparatus may include an image display interface module and a viewer action bar module. Functions of each module are described as follows.

The image display interface module is responsible for displaying a decoded image.

The viewer action bar module is responsible for displaying some operating buttons of a form of a viewer, including a button of automatically generating an album.

The image encoding/decoding apparatus may include an image decoding module and an image encoding module. Functions of each module are described as follows.

The image decoding module is configured to parse and change code of an image into an information flow of an initial image, for example, image data in an RGB format.

The image encoding module is configured to encode the information flow of the initial image to an image format such as JPEG.

The photo processing apparatus may automatically collate a photo based on facial recognition. First, face detection is performed on a photo of a user. Then, portrait photos that have a high similarity are put into a same album through face similarity calculation, and the album is displayed to a user. The user annotates a name of a person for the album, and then classifies and names photos in the album according to dates and names of persons, to generate a personal album for each person. Detailed description is given in the following. Referring to FIG. 3, FIG. 3 is a schematic diagram of an application scenario of a photo processing method according to an embodiment of the present disclosure.

Step S01: Perform face detection on all photos, and classify photos on which no face image feature is detected into a scenic album, and it is assumed that a detected face image feature set is $F=\{f_1, f_2, \ldots, f_n\}$, and a photo that corresponds to $f_i$ is Pi.

Step S02: For each pair of face image features $f_i$ and $f_j$ (i is not equal to j) in F, a similarity between $f_i$ and $f_j$ is calculated by using a facial recognition algorithm. A similarity matrix $M=\{S_{i,j}|i\neq j\}$ is obtained, where $s_{ij}$ is the similarity between $f_i$ and $f_j$.

Step S03: Each face image feature $f_i$ in F is initialized as a photo set $A_i$, and perform the following processing in a cyclic manner until there is no combinable set.

An photo set-level similarity $$\bar{s} = \left\{ \frac{1}{n_i n_j} \sum s_{ij}(f_i \in A_i, f_j \in A_j) \right\}$$

is calculated for $A_i$ and $A_j$. If the photo set-level similarity is greater than a similarity threshold, 90%, $A_i$ and $A_j$ are combined; otherwise $A_i$ and $A_j$ are not combined, where $A_i$ represents one of the two photo sets, $A_j$ represents the other of the two photo sets, $f_i$ represents a face image feature that corresponds to a photo in the photo set $A_i$, $f_j$ represents a face image feature that corresponds to a photo in the photo set $A_j$, $s_{ij}$ represents a similarity that corresponds to a pair of face image features formed by the face image feature $f_i$ and the face image feature $f_j$, $n_i$ represents a quantity of photos in the photo set $A_i$, and $n_j$ represents a quantity of photos in the photo set $A_j$.

Step S04: Prompt the user to name a combined photo set, and make the user to name each photo set that is output after the circulation ends.

For example, a photo set that is output after the circulation ends is $A=\{A_1, A_2, \ldots, A_n\}$, A represents all of the photo sets that are output after the circulation ends, and $A_1$, $A_2, \ldots, A_n$ represents n photo sets that can no longer be combined.

Step S05: Divide the output photo set into subsets, and name the subsets according to photographing dates of the photos.

An album is generated, according to a name given by the user, for a photo Pi that corresponds to $A_i$. The album is divided into sub-albums according to photographing dates, and a name of each sub-album is a person name+time. All generated portrait albums and scenic albums are displayed to the user.

It may be learned from the exemplary descriptions in the foregoing embodiments and for the present disclosure, in this embodiment of the present disclosure, the facial recognition technology is used to calculate a similarity between face image features between photos, and is highly accurate. To classify photos according to portraits meet a requirement of a user to search a photo of a related person, and to name an album by combining a name of a person and time is convenient for the user to brows the album.

It should be noted that, for ease of description, the foregoing embodiments are described as combination of a series of movements. However, persons skilled in the art should know that the present disclosure is not limited to any described sequence of the movements, because some steps, according to the present disclosure, can be performed in another sequence or simultaneously performed. In addition, persons skilled in the art should also know that the embodiments described in the specification all belong to preferred embodiments, and the involved actions and modules are not necessarily mandatory to the present disclosure.

For the convenience of a better implementation of the foregoing solutions of the embodiments of the present disclosure, the following further provides related apparatuses configured to implement the foregoing solutions.

Referring to FIG. 4-a, an embodiment of the present disclosure provides a photo processing apparatus 400. The photo processing apparatus 400 may include: a face detection module 401, a face similarity calculation module 402, an album combination module 403, and an album output module 404.

The face detection module 401 is configured to separately perform face detection on multiple photos, to obtain a face image feature set, each face image feature in the face image feature set corresponding to one of the multiple photos.

In this embodiment of the present disclosure, face detection is separately performed on multiple photos that need to be classified, to obtain a face image feature set. The face image feature set includes face image features that are detected on each photo. Each face image feature in the face image feature set corresponds to a photo.

The face similarity calculation module 402 is configured to perform face match similarity calculation on each pair of face image features in the face image feature set, to obtain a face-level similarity that corresponds to the pair of face image features.

Each pair of face image features are obtained by combining any two face image features in the face image feature set.

The album combination module 403 is configured to: generate a photo set for the photo that corresponds to each face image feature in the face image feature set; use an initial photo set as an initial condition; determine, through calculation in a cyclic manner for multiple times according to the similarity that corresponds to each pair of face image features, whether a photo set-level similarity between two photo sets exceeds a preset similarity threshold; and combine two photo sets whose photo set-level similarity exceeds the photo set-level similarity threshold into one photo set until there is no combinable photo set.

For example, the album combination module first combines photo sets in which photos that correspond to a pair of face image features whose face-level similarity is greater than a preset face-level similarity threshold. Then, a photo set-level similarity between the combined photo set and another photo set is calculated according to the similarity that corresponds to each pair of face image features. If the photo set-level similarity between the combined photo set and the another photo set exceeds the photo set-level similarity threshold, the two photo sets are combined into one photo set.

The album output module 404 is configured to output at least one photo set that is obtained after the circulation ends. Each photo set that is obtained after the circulation ends includes at least one photo that corresponds to a same person.

In some embodiments of the present disclosure, referring to FIG. 4-b, the photo processing apparatus 400 further includes an album naming module 405, configured to: after the album output module 404 outputs the at least one photo set that is obtained after the circulation ends, prompt the user to perform album naming, on each photo set that is obtained after the circulation ends, according to a same person that corresponds to all photos in the photo set; and change a name of each photo set obtained after the circulation ends into a naming result that is entered by the user.

In some embodiments of the present disclosure, referring to FIG. 4-c, relative to FIG. 4-a, the photo processing apparatus 400 further includes a photo sorting and dividing module 406, configured to: after the album output module 404 outputs the least one photo set that is obtained after the circulation ends, sort, according to an order of photographing time of the photos, all photos in each photo set that is output after the circulation ends, or divide, according to the order of photographing time of the photos, all of the photos in each photo set that is output after the circulation ends into different photo subsets; and name each sub-album according to the photographing time.

In some embodiments of the present disclosure, the album output module 404 is further configured to: after the face detection module separately performs the face detection on all of the photos that need to be classified, input a photo, that is in all of the photos that need to be classified, on which no face image feature is detected to a non-portrait album.

In some embodiments of the present disclosure, the album combination module 403 is specifically configured to calculate the photo set-level similarity between the two photo sets in the following manner:

$$\bar{s} = \left\{ \frac{1}{n_i n_j} \sum s_{ij}(f_i \in A_i, f_j \in A_j) \right\},$$

where $\bar{s}$ represents a photo set-level similarity, $A_i$ represents one of the two photo sets, $A_j$ represents the other of the two photo sets, $f_i$ represents a face image feature that corresponds to a photo in the photo set $A_i$, $f_j$ represents a face image feature that corresponds to a photo in the photo set $A_j$, $s_{ij}$ represents a similarity that corresponds to a pair of face image features formed by the face image feature $f_i$ and the face image feature $f_j$, $n_i$ represents a quantity of photos in the photo set $A_i$, and $n_j$ represents a quantity of photos in the photo set $A_j$, i and j being two unequal natural numbers.

It may be learned by using the foregoing descriptions that is in this embodiment and that is of the embodiment of the present disclosure, first, face detection is separately performed on all photos that need to be classified, to obtain a face image feature set. Then, a similarity that corresponds to each pair of face image features is calculated. Next, a photo corresponding to each face image feature in the face image feature set is used as an initial photo set, and the initial photo set is used as an initial condition. Whether a photo set-level similarity between two photo sets exceeds a preset similarity threshold is determined through calculation in a cyclic manner for multiple times according to the face-level similarity that corresponds to the pair of face image features. Two photo sets whose photo set-level similarity exceeds the photo set-level similarity threshold are combined into one photo set until there is no combinable photo set. Finally, at least one photo set obtained after the circulation ends is output. Each photo set that is obtained after the circulation ends includes at least one photo that corresponds to a same person. In this embodiment of the present disclosure, because the photo sets are combined by using a similarity between the face image features, all of the combined photo sets include photos that correspond to a same person. Therefore, in this embodiment of the present disclosure, all photos that need to be classified can be divided into different photo sets according to face image features, so that all photos that are included in a same photo set that is finally output correspond to a same person. Therefore, photos may be automatically grouped based on facial recognition results, and a requirement that a user browses multiple albums according to portrait classification is met.

FIG. 5 is a schematic structural diagram of a computing device according to an embodiment of the present disclosure. The computing device 500 may have a relatively great difference due to different configuration or performance, and may include one or more central processing units (central processing units, CPU) 522 (for example, one or more processors), a memory 532, one or more storage applications 542, or a storage medium 530 (for example, one or more mass storage devices) of data 544. The memory 532 and the storage medium 530 may be transient storage or persistent storage. A program stored in the storage medium 530 may include one or more modules (not shown in the figure), and each module may include a series of instruction operations in the computing device. Furthermore, the central processing unit 522 may be configured to communicate with the storage medium 530, and perform, in the computing device 500, a series of instruction operations in the storage medium 530.

The computing device 500 may further include one or more power supplies 526, one or more wired or wireless network interfaces 550, one or more input/output interfaces 558, and/or, one or more operating systems 541, such as Windows Server™, Mac OS X™, Unix™, Linux™, and FreeBSD™.

The steps performed by the computing device in the foregoing embodiment may be based on the computing device structure shown in FIG. 5.

It may be learned by using the foregoing descriptions that is in this embodiment and that is of the embodiment of the present disclosure, first, face detection is separately performed on all photos that need to be classified, to obtain a face image feature set. Then, a similarity that corresponds to each pair of face image features is calculated. Next, a photo corresponding to each face image feature in the face image feature set is used as an initial photo set, and the initial photo set is used as an initial condition. Whether a photo set-level similarity between two photo sets exceeds a preset similarity threshold is determined through calculation in a cyclic manner for multiple times according to the face-level similarity that corresponds to the pair of face image features. Two photo sets whose photo set-level similarity exceeds the photo set-level similarity threshold are combined into one photo set until there is no combinable photo set. Finally, at least one photo set obtained after the circulation ends is output. Each photo set that is obtained after the circulation ends includes at least one photo that corresponds to a same person. In this embodiment of the present disclosure, because the photo sets are combined by using a similarity between the face image features, all of the combined photo sets include photos that correspond to a same person. Therefore, in this embodiment of the present disclosure, all photos that need to be classified can be divided into different photo sets according to face image features, so that all photos that are included in a same photo set that is finally output correspond to a same person. Therefore, photos may be automatically grouped based on facial recognition results, and a requirement that a user browses multiple albums according to portrait classification is met.

Furthermore, it should be noted that the described apparatus embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in the present disclosure, connection relationships between modules indicate that the modules have communication connections with each other, which may be specifically implemented as one or more communications buses or signal cables. Persons of ordinary skill in the art may understand and implement the embodiments of the present disclosure without creative efforts.

Based on the description of the foregoing implementations, persons skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. In addition, a specific hardware structure used to achieve a same function may be of various forms, for example, in a form of an analog circuit, a digital circuit, or a dedicated circuit. However, as for the present disclosure, a software program implementation is a better implementation in most cases. Based on such an understanding, the technical solutions of the present disclosure essentially or the part contributing to the existing technology may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computing device (which may be a personal computer, a server, a network device, and the like) to perform the methods described in the embodiments of the present disclosure.

Based on the above, the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as such modifications and replacements do not cause the essence of the present disclosure to depart from the spirit and scope of the technical solutions of the embodiments of the present disclosure.

What is claimed is:

1. A method for generating a plurality of photo albums performed at a computing device having one or more processors and memory storing one or more programs to be executed by the one or more processors, the method comprising:

performing face detection on multiple photos to obtain a face image feature set, each face image feature in the face image feature set corresponding to one of the multiple photos;

determining a face-level similarity for each pair of face image features in the face image feature set;

determining a photo-level similarity between each pair of photos in the multiple photos in accordance with their associated face-level similarities, wherein the photo-level similarity between a respective pair of photos is a summation of the face-level similarity between the face image features of the respective pair of photos;

selecting, from the multiple photos, a photo set for each target photo, wherein any photo-level similarity between the target photo and another photo in the photo set exceeds a predefined photo-level threshold;

determining a photo set-level similarity between each pair of photo sets associated with the multiple photos, wherein a respective photo set-level similarity between two photo sets is determined according to face-level similarities corresponding to the two photo sets respectively as follows:

$$\bar{s} = \left\{ \frac{1}{n_i n_j} \sum s_{ij}(f_i \in A_i, f_j \in A_j) \right\},$$

$\bar{s}$ represents the photo set-level similarity, $A_i$ represents one of the two photo sets, $A_j$ represents the other of the two photo sets, $f_i$ represents a face image feature that corresponds to a photo in the photo set $A_i$, $f_j$ represents a face image feature that corresponds to a photo in the photo set $A_j$, $s_{ij}$ represents a similarity that corresponds to a pair of face image features formed by the face image feature $f_i$ and the face image feature $f_j$, $n_i$ represents a quantity of photos in the photo set $A_i$, and $n_j$ represents a quantity of photos in the photo set $A_j$, i and j being two unequal natural numbers;

combining at least two photo sets into one photo album in accordance with a determination that a face-level similarity between two face image features of two photos from the two photo sets is greater than a preset face-level similarity threshold and any photo set-level similarities of the two photo sets exceeds a predefined photo set-level threshold, respectively; and generating one or more labels for each of a plurality of photo albums using photographing location and photographing time information associated with the photos within the photo album accordingly.

2. The method according to claim 1, further comprising:
selecting labels of the at least two photo sets to be combined into a combined photo album; and
combining the identified labels into one label for the combined photo album.

3. The method according to claim 1, wherein the photo-level similarity between a pair of photo sets is determined according to respective numbers of photos included in each photo set of the pair of photo sets.

4. The method according to claim 1, further comprising:
displaying the one or more labels for each photo album to an end user; and
prompting the user to update the one or more labels for the photo album.

5. The method according to claim 1, further comprising:
sorting photos in each output photo album according to an order of photographing time of the photos.

6. The method according to claim 5, further comprising:
dividing photos in each output photo album into different photo subsets according to the order of photographing time of the photos; and
generating a sub-label for each photo subset according to the photographing time of the photos in the photo subset.

7. A computing device, comprising:
one or more processors;
memory coupled to the one or more processors; and
a plurality of program instructions stored in the memory that, when executed by the one or more processors, cause the computing device to perform a plurality of operations including:

performing face detection on multiple photos to obtain a face image feature set, each face image feature in the face image feature set corresponding to one of the multiple photos;

determining a face-level similarity for each pair of face image features in the face image feature set;

determining a photo-level similarity between each pair of photos in the multiple photos in accordance with their associated face-level similarities, wherein the photo-level similarity between a respective pair of photos is a summation of the face-level similarity between the face image features of the respective pair of photos as follows:

$$\bar{s} = \left\{ \frac{1}{n_i n_j} \sum s_{ij}(f_i \in A_i, f_j \in A_j) \right\},$$

$\bar{s}$ represents the photo set-level similarity, $A_i$ represents one of the two photo sets, $A_j$ represents the other of the two photo sets, $f_i$ represents a face image feature that corresponds to a photo in the photo set $A_i$, $f_j$ represents a face image feature that corresponds to a photo in the photo set $A_j$, $s_{ij}$ represents a similarity that corresponds to a pair of face image features formed by the face image feature $f_i$ and the face image feature $f_j$, $n_i$ represents a quantity of photos in the photo set $A_i$, and $n_j$ represents a quantity of photos in the photo set $A_j$, i and j being two unequal natural numbers;

selecting, from the multiple photos, a photo set for each target photo, wherein any photo-level similarity between the target photo and another photo in the photo set exceeds a predefined photo-level threshold;

determining a photo set-level similarity between each pair of photo sets associated with the multiple photos, wherein a respective photo set-level similarity between two photo sets is determined according to face-level similarities corresponding to the two photo sets respectively;

combining at least two photo sets into one photo album in accordance with a determination that a face-level similarity between two face image features of two photos from the two photo sets is greater than a preset face-level similarity threshold and any photo set-level similarities of the two photo sets exceeds a predefined photo set-level threshold, respectively; and generating one or more labels for each of a plurality of photo albums using photographing location and photographing time information associated with the photos within the photo album accordingly.

8. The computing device according to claim 7, wherein the plurality of operations further comprise:
selecting labels of the at least two photo sets to be combined into a combined photo album; and
combining the identified labels into one label for the combined photo album.

9. The computing device according to claim 7, wherein the photo-level similarity between a pair of photo sets is determined according to respective numbers of photos included in each photo set of the pair of photo sets.

10. The computing device according to claim 7, wherein the plurality of operations further comprise:
displaying the one or more labels for each photo album to an end user; and
prompting the user to update the one or more labels for the photo album.

11. The computing device according to claim 7, wherein the plurality of operations further comprise:
sorting photos in each output photo album according to an order of photographing time of the photos.

12. The computing device according to claim 11, wherein the plurality of operations further comprise:
dividing photos in each output photo album into different photo subsets according to the order of photographing time of the photos; and
generating a sub-label for each photo subset according to the photographing time of the photos in the photo subset.

13. A non-transitory computer readable storage medium, wherein the storage medium stores a plurality of program instructions that, when executed by one or more processors of a computing device, cause the computing device to perform a plurality of operations including:
performing face detection on multiple photos to obtain a face image feature set, each face image feature in the face image feature set corresponding to one of the multiple photos;
determining a face-level similarity for each pair of face image features in the face image feature set;
determining a photo-level similarity between each pair of photos in the multiple photos in accordance with their associated face-level similarities, wherein the photo-level similarity between a respective pair of photos is a summation of the face-level similarity between the face image features of the respective pair of photos as follows:

$$\bar{s} = \left\{ \frac{1}{n_i n_j} \sum s_{ij}(f_i \in A_i, f_j \in A_j) \right\},$$

$\bar{s}$ represents the photo set-level similarity, $A_i$ represents one of the two photo sets, $A_j$ represents the other of the two photo sets, $f_i$ represents a face image feature that corresponds to a photo in the photo set $A_i$, $f_j$ represents a face image feature that corresponds to a photo in the photo set $A_j$, $s_{ij}$ represents a similarity that corresponds to a pair of face image features formed by the face image feature $f_i$ and the face image feature $f_j$, $n_i$ represents a quantity of photos in the photo set $A_i$, and $n_j$ represents a quantity of photos in the photo set $A_j$, i and j being two unequal natural numbers;

selecting, from the multiple photos, a photo set for each target photo, wherein any photo-level similarity between the target photo and another photo in the photo set exceeds a predefined photo-level threshold;

determining a photo set-level similarity between each pair of photo sets associated with the multiple photos, wherein a respective photo set-level similarity between two photo sets is determined according to face-level similarities corresponding to the two photo sets respectively;

combining at least two photo sets into one photo album in accordance with a determination that a face-level similarity between two face image features of two photos from the two photo sets is greater than a preset face-level similarity threshold and any photo set-level similarities of the two photo sets exceeds a predefined photo set-level threshold, respectively; and generating one or more labels for each of a plurality of photo albums using photographing location and photographing time information associated with the photos within the photo album accordingly.

14. The non-transitory computer readable storage medium according to claim 13, wherein the plurality of operations further comprise:
selecting labels of the at least two photo sets to be combined into a combined photo album; and
combining the identified labels into one label for the combined photo album.

15. The non-transitory computer readable storage medium according to claim 13, wherein the photo-level similarity between a pair of photo sets is determined according to respective numbers of photos included in each photo set of the pair of photo sets.

16. The non-transitory computer readable storage medium according to claim 13, wherein the plurality of operations further comprise:
displaying the one or more labels for each photo album to an end user; and
prompting the user to update the one or more labels for the photo album.

17. The non-transitory computer readable storage medium according to claim 13, wherein the plurality of operations further comprise:
sorting photos in each output photo album according to an order of photographing time of the photos;

dividing photos in the output photo album into different photo subsets according to the order of photographing time of the photos; and generating a sub-label for each photo subset according to the photographing time of the photos in the photo subset.

\* \* \* \* \*